United States Patent [19]

Ehre

[11] Patent Number: 4,666,491
[45] Date of Patent: May 19, 1987

[54] PROCESS AND APPARATUS FOR USE IN THE FABRICATION OF A GLASS PANE

[75] Inventor: Hubert Ehre, Herzogenrath, Fed. Rep. of Germany

[73] Assignee: Saint Gobain Vitrage, Courbevoie, France

[21] Appl. No.: 862,726

[22] Filed: May 13, 1986

[30] Foreign Application Priority Data

May 17, 1985 [DE] Fed. Rep. of Germany ....... 3517835

[51] Int. Cl.⁴ .......................................... C03B 23/023
[52] U.S. Cl. ........................................ 65/27; 65/104; 65/114; 65/168; 65/351
[58] Field of Search .................... 65/27, 104, 168, 114, 65/348, 351

[56] References Cited

U.S. PATENT DOCUMENTS 3,268,429 8/1966 Farrow ............................... 65/27 X
4,138,241 2/1979 McKelvey .......................... 65/27 X
4,233,048 11/1980 Gintert ................................... 65/27

Primary Examiner—Arthur Kellogg
Attorney, Agent, or Firm—Pennie & Edmonds

[57] ABSTRACT

The invention relates to a process for the bending and toughening of glass panes in a horizontal position during movement from a bending station through a toughening station to a transfer station. A monitoring device in the form of a detector, located in the transfer station, provides a signal of whether or not a glass pane is located on a carriage for moving the glass pane between stations. The apparatus includes a blowing device responsive to a signal from the detector to blow jets of compressed air on the carriage during return movement to the bending station under the circumstance that a glass pane is not located on the carriage to free the carriage of any adhering glass splinters.

6 Claims, 1 Drawing Figure

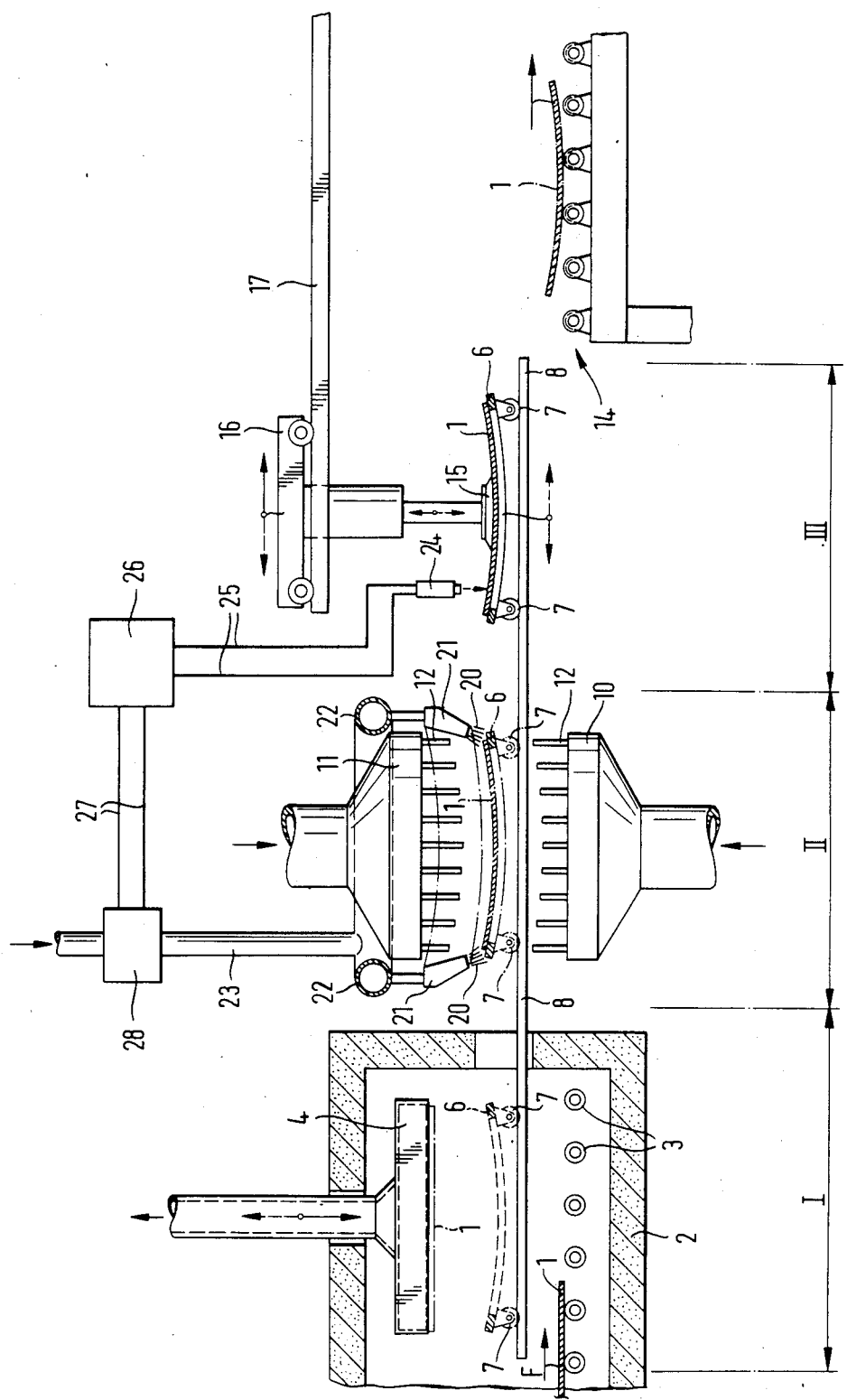

PROCESS AND APPARATUS FOR USE IN THE FABRICATION OF A GLASS PANE

TECHNICAL FIELD

The invention concerns the fabrication of a glass pane. Particularly, the invention relates to apparatus for sensing the presence or absence of a glass pane on a carriage at a location along a fabrication line, and apparatus for taking preventative action including the blowing clean of all support surfaces of the carriage in return to a starting location in the event that no glass pane to have been carried by the carriage is sensed.

BACKGROUND OF THE INVENTION

Typically, in the fabrication of a tempered or toughened automotive glass pane the glass pane is heated to a bending temperature in a continuous furnace, deposited on a carriage in the form of a bending mold and bent to a prescribed contour, and toughened by rapid cooling prior to removal from the bending mold. It occasionally happens that during the process step of toughening, or immediately thereafter, that the glass pane on the bending mold will break into small crumbs and splinters. It may be apparent that all residue of the glass pane in the form of small crumbs and splinters that may adhere to the bending mold should be eliminated from its surface lest they result in undesirable impairment or deformation of a following glass pane to be transported by the bending mold in carrying out the process steps previously mentioned. To overcome the possibility of undesirable impairment or deformation of a glass pane caused by situating the glass pane on the bending mold, typically a peripheral bending mold, and the residue it may carry, the bending mold is subjected to cleansing by one or more jets of air. According to the prior art, the bending mold will be subjected to the cleaning step by air from the air jets each and every time the mold returns to the location for deposit of a second and each subsequent glass pane for movement through the processing stations.

The known prior art, therefore, requires a considerable use of power and consequently the fabrication process is subject to increased costs through the implementation of an air jetting procedure during each return movement of the bending mold.

SUMMARY OF THE INVENTION

The invention is directed to the end of increasing the economy of operation of a process of the type previously described. According to an important aspect of the invention, the process and apparatus for the bending and toughening a glass pane includes the additional process steps, and the apparatus for carrying out the process steps, of sensing at a prescribed location the presence or the absence of a glass pane on a bending mold and activating an air jetting apparatus for cleaning the bending mold upon return to a starting location when, and only when, no glass pane is sensed.

The sensing step is carried out by automatic monitoring apparatus and serves to conserve a considerable quantity of energy. The savings in the cost of energy may be realized when one considers that the air jetting apparatus includes a plurality of nozzles to cover the area of the surface of the bending mold, that each nozzle serves as a source of a jet of air compressed, for example, to approximately 6 bar during a period of about two seconds' time, and that only rarely is there a need to implement the air jetting apparatus. Thus, the power required to clean the peripheral bending mold is reduced by the invention to that of a small fraction of that power heretofore expended.

The invention and other important aspects will be discussed as the text to be read in conjunction with a consideration of the drawing continues.

BRIEF DESCRIPTION OF THE DRAWING

The FIGURE illustrates schematically the apparatus and the process of the invention.

BEST MODE FOR CARRYING OUT THE INVENTION

The FIGURE illustrates several stations along a fabrication line for glass panes including a bending station (I), followed by a toughening station (II) and, in turn, followed by a transfer station (III). A glass pane 1, more particularly, a series of glass panes are illustrated in the FIGURE in operative positions at the several stations and subject to processing at the respective stations. As illustrated, the glass pane is processed while in a horizontal attitude and moved horizontally from one station to the next, and ultimately to a downstream station from which glass panes are transported to further processing stations.

The bending station, more particularly, is located at the downstream end of a continuous furnace 2, near the exit opening. The furnace may be considered to be of standard construction and provides a heating enclosure within which each glass pane is heated to a bending temperature. Heating may occur simultaneously with movement of the glass panes seriatim through the furnace. Movement of glass panes is in the direction F along a series of rollers 3. The rollers may be driven by any conventional drive means and function to move individual glass panes within the furnace to a transfer point at which they are stopped for transfer of the glass pane from the rollers.

A transfer mechanism is formed by a plate 4 which is movable between a raised portion (the position of the plate in the FIGURE) and a lowered position at which the plate contacts the upper surface of the glass pane.

Plate 4 includes a surface of ceramic material. The plate is connected to a source of vacuum at a pressure sufficient to "grip" glass pane 1 and lift it from the rollers 3 in return movement from the lowered position to the raised position. The FIGURE illustrates a glass plate in dot-dash line as having been lifted from the rollers and moved to the raised position.

The directions of movement of the plate and a representation of the connection of the plate to the source of vacuum are represented by arrows in the FIGURE.

A track formed by a pair of parallel, spaced rails 8 extends through the exit opening into the furnace 2. The track is positioned between the rollers 3 and plate 4, in the raised position, and extends from a location within the furnace of the bending station I to a downstream location of the transfer station III.

A carriage in the form of a bending mold 6 including a plurality of rollers 7 is movable along the track in a first direction from a first position within the bending station and in a second, opposite direction in return movement to the bending station following a full traverse movement through the toughening station II and transfer station III. As illustrated, the bending mold is shaped to the contour that each glass pane is to be bent.

After a glass pane 1 has been transferred by plate 4 by suction from rollers 3 to a raised position above the track, the bending mold 6 is moved into the bending station I. The source of negative pressure preferably is communicated to the glass pane through one or more openings in the plate 4. Movement of the bending mold is controlled by means not shown, but conventional. At this time during the complete process the negative pressure acting on the glass pane is released so that the glass pane falls from the raised position onto bending mold 6. The glass pane which previously was heated to the bending temperature is shaped to the contour of the bending mold. The glass pane undergoes bending by its own weight and as a consequence of the fall.

The bending mold 6 and glass pane 1 which it carries are controlled in movement to the toughening station II. The toughening station may be disposed beside or behind the bending station I.

The toughening station II includes a pair of boxes 10, 11 located, respectively, below and above the track formed by rails 8. Each box which may be characterized as a "blowing box" supports a plurality of individual nozzles 12 which communicate through a respective box to a source of air. The location of the boxes permits air to be blown on opposite surfaces of the glass pane 1. As soon as the bending mold and glass pane are positioned in the toughening station the boxes 10, 11 are communicated to the source of blowing air. The result is that the glass pane is abruptly cooled and toughened.

The bending mold 6 and glass pane 1, following toughening, are moved to the transfer station III. It is at the transfer station that the glass pane is removed from the bending mold and transferred to the supporting track of a conveyor 14. The conveyor formed by a series of rollers driven by any means as may be conventional functions to move the bent, toughened glass pane to a subsequent processing location, or storage for that matter.

The transfer device at transfer station III may include a plate 15 supported on a carriage 16. The carriage includes a plurality of rollers for movement along a track formed by a pair of spaced, parallel rails 17. The plate is movable between a first position, above the rails 8 of the track along which the bending mold 6 moves, and a second position which may be at the level of the glass pane carried by the bending mold 6 along the rails of the track or at a lower level as determined by the location of conveyor 14. In the transfer of the glass pane, plate 15 is lowered into contact with the glass pane. The plate, like plate 4, is connected to a source of vacuum having sufficient pressure to lift the glass pane from the bending mold 6 and support it during movement. Other types of transfer means as are well known may be used as well.

When the glass pane 1 has been transferred from the bending mold 6, the bending mold appropriately is returned to the bending station I. Upon return movement the several process steps of bending, toughening and transfer may be carried out on the next and each subsequent glass pane. The return movement of the bending mold to the bending station takes the bending mold through the toughening station at which it may be subjected to a cleaning action by compressed air 20 which shall flow through each of a plurality of nozzles 21. Each nozzle is supported by a ring-shaped housing which is communicated by a line 23 to a source of pressure. The communication is indicated by the directional arrow. Preferably, the housing will have an outline similar to that of the support surface of the bending mold, and the several nozzles will be directed so that the compressed air moves toward and throughout the support surface.

On occasion, a glass pane will break during the toughening step so that the bending mold arrives at the transfer station without a supported glass pane. If a glass pane does break it is not uncommon that glass crumbs and splinters will remain on the surface of the bending mold. This residue must be eliminated from the bending mold prior to the return movement to the bending station I and receipt thereon of a second or subsequent glass pane. The cleansing of the bending mold is accomplished in the toughening station II by operation of compressed air 20. As previously stated, however, it is unlikely that any great number of glass panes will break during the operative steps of treatment so that operation of the compressed air must be controlled as determined by the absence of the glass pane at the transfer location.

According to the invention, a detector 24 is located at the transfer station III and positioned to detect the presence or absence of a glass pane 1 when the bending mold moves from toughening station to transfer station. The detector may be located either above or below the track upon which the bending mold moves. The detector may be an optoelectronic apparatus, such as a reflection light barrier, or a suitable pneumatically operated sensor, known by the designation "flow guard". These types of detectors are known. Depending on the particular construction of the detector 24, it may be necessary to dispose a transmitter corresponding to the detector on the opposite side of the track so that the rays of light and jets of gas emanating from the transmitter will be interrupted by the glass pane 1.

The detector 24 is connected to a control unit 26 and a signal indicative of the presence or absence of a glass pane is carried by lines 25 connecting the detector and control unit. In the event that the control unit receives a signal that no glass pane is present on the bending mold then valve 28 is controlled open for a period of time to communicate the source of compressed air with housing 22 and nozzles 21. Lines 27 connect the valve and control unit and it has been found that a controlled opening of valve 28 during about two seconds' time will be sufficient to clean any residue in the form of glass crumbs and splinters which may have adhered to the bending mold under circumstances that no glass pane is sensed present. Thus, the danger of damage occurring to a subsequent glass pane by glass crumbs and splinters on the bending mold will have been overcome.

I claim:

1. In a process for bending and toughening a glass pane while in a horizontal attitude including the steps of heating the glass pane to bending temperature in a continuous furnace, bending the glass pane by depositing it on a bending mold and subsequently toughening the glass pane while carried by the bending mold capable of movement in a first direction from a first position, the improvement in the process comprising detecting the presence or absence of a glass pane on said bending mold after toughening at a second position, prior to return of said bending mold to said first position, and blowing air in a jet from a source on said bending mold during movement in return to said first position under circumstances that no glass pane is detected, said blowing air serving to free said bending mold of any glass crumbs and splinters which may remain as residue from a broken glass pane.

2. Apparatus for use in the process of bending and toughening a glass pane having first been heated to a bending temperature including a carriage adapted to support said glass pane for movement in a first direction from a first to a second position, said glass pane during movement in said first direction, following bending to a prescribed contour, being toughened and removed from said carriage at said second position, means for moving said carriage from said first to second position and in return to said first position, detector means for detecting the presence or absence of a glass pane on said carriage, said detector means located between said positions following a location of toughening of said glass pane, a source of compressed air, means for blowing a jet of air from said source on said carriage, and means for communicating said blowing means and source under circumstances that said detector means may have sensed the absence of a glass pane whereby said air acts to relieve any glass crumbs and splinters which may have adhered as residue from a broken pane during movement of said carriage in return to said first position.

3. The apparatus of claim 2 further including a control unit, and wherein said communicating means includes a valve, said control unit responsive to said detector means and a signal representing no glass pane to open said valve.

4. The apparatus of claim 2 wherein said blowing means includes a housing having an outline substantially similar to that of said carriage, and a plurality of nozzles supported by said housing, with each nozzle directed to a position to be occupied by said carriage.

5. The apparatus of claim 2 wherein said detector means is a pneumatically operated sensor.

6. The apparatus of claim 2 wherein said detector means is a reflection light barrier.

* * * * *